Oct. 8, 1929.   A. R. HENDRY ET AL   1,731,132
TIRE PATCH CUTTING APPARATUS
Filed Sept. 11, 1928   3 Sheets-Sheet 1
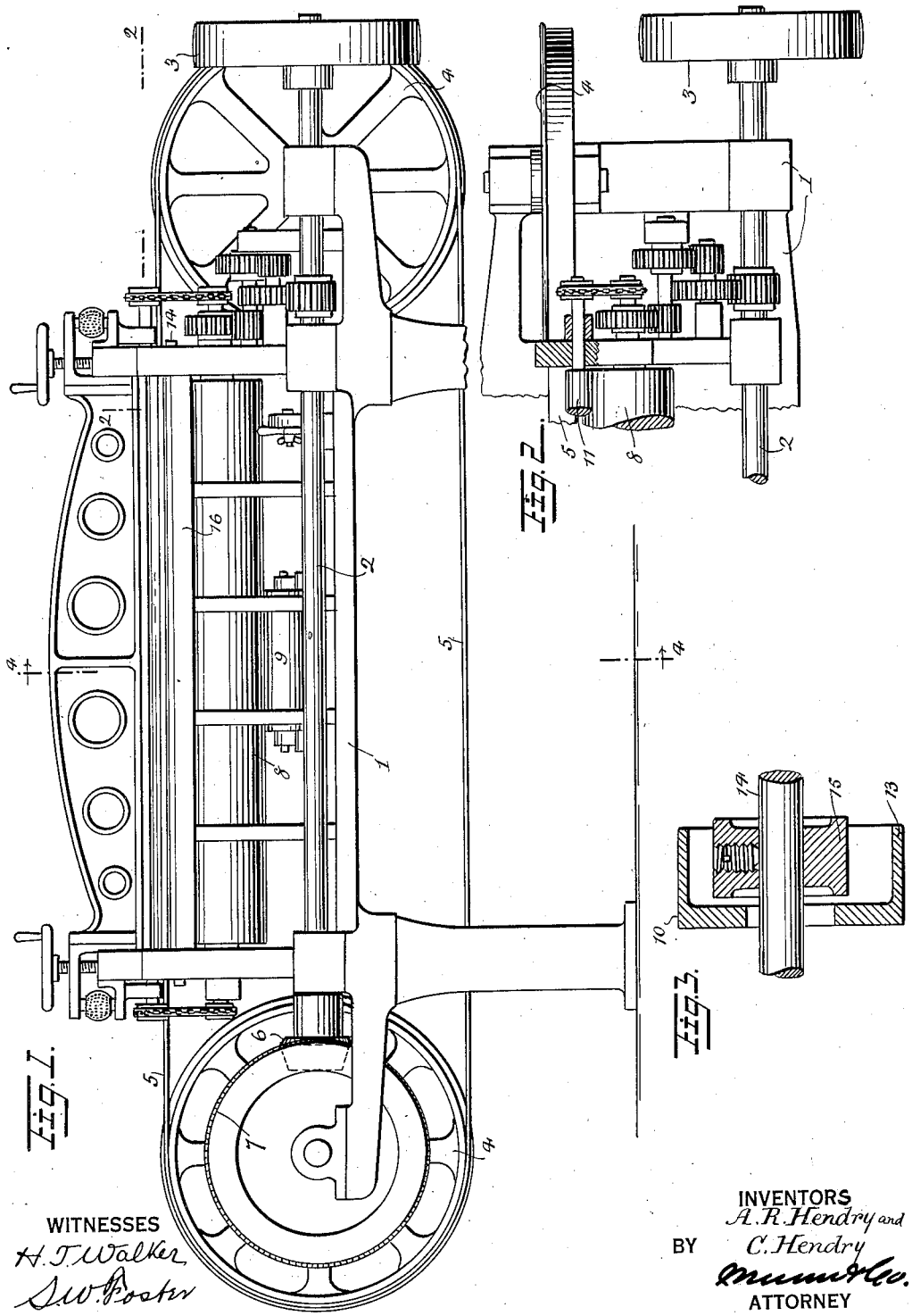
WITNESSES
H. T. Walker
S. W. Foster
INVENTORS
A. R. Hendry and
C. Hendry
BY
ATTORNEY Oct. 8, 1929.  A. R. HENDRY ET AL  1,731,132
TIRE PATCH CUTTING APPARATUS
Filed Sept. 11, 1928  3 Sheets-Sheet 2
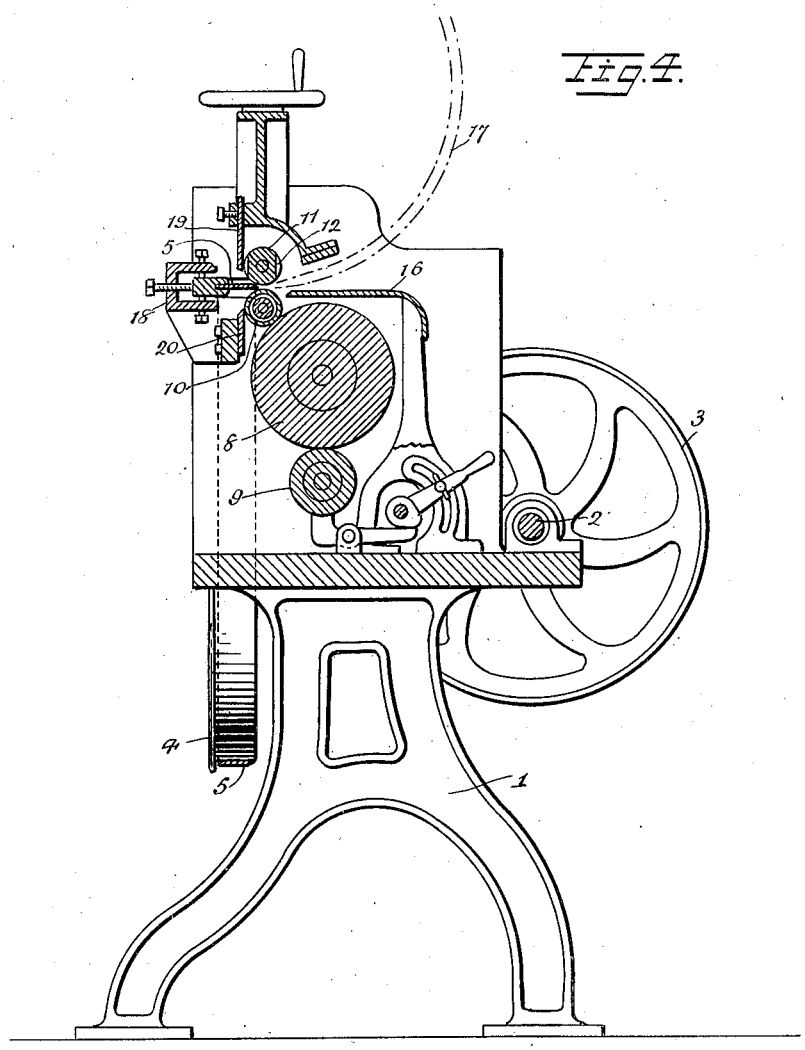
INVENTORS
A. R. Hendry and
C. Hendry
BY
ATTORNEY
WITNESSES

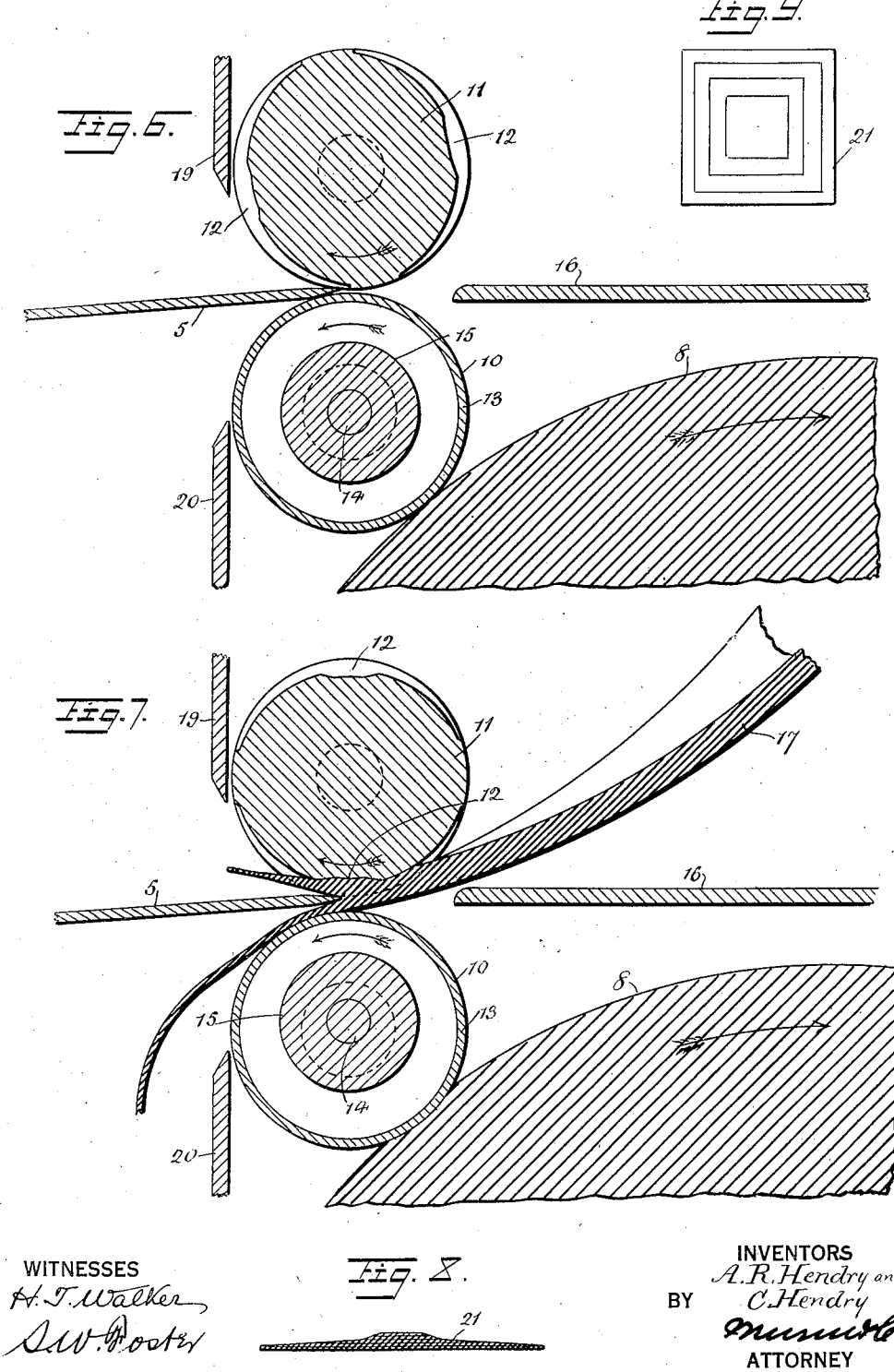

Patented Oct. 8, 1929

1,731,132

UNITED STATES PATENT OFFICE

ADOLPH R. HENDRY AND CHARLES HENDRY, OF PASSAIC, NEW JERSEY

TIRE-PATCH-CUTTING APPARATUS

Application filed September 11, 1928. Serial No. 305,173.

This invention relates to tire patch cutting apparatus, an object of the invention being to provide an apparatus which will cut from the tire or other strip fed thereto patches such as are employed in repairing tires. In other words, our improved apparatus facilitates the making of tire patches from old and used tires and forms patches uniformly, accurately and quickly so that we are enabled to produce a large number of patches in a relatively short space of time thereby greatly reducing the cost of the production of the patches and at the same time insuring patches of perfect shape.

In carrying out our invention we employ a machine such as is commonly known in the trade as a belt-knife splitting machine, incorporating certain features in connection with the machine whereby it may be utilized for making tire patches or other articles.

With these and other objects in view, the invention consists in certain novel features of construction and combinations and arrangements of parts which will be more fully hereinafter described and pointed out in the claim.

In the accompanying drawings—

Figure 1 is a view in side elevation of the machine embodying our invention;

Figure 2 is a fragmentary plan view of the right hand end of the machine shown in Figure 1;

Figure 3 is a detail view showing a portion of the gage roll of the machine;

Figure 4 is a view in transverse section on the line 4—4 of Figure 1;

Figure 5 is a fragmentary view partly in elevation and partly broken away illustrating a portion of our improved pattern roll;

Figure 6 is an enlarged fragmentary view in transverse section illustrating the position of the belt-knife and its co-operating parts;

Figure 7 is a view similar to Figure 5 illustrating the operation of cutting a patch from a tire, the parts being the same as illustrated in Figure 6;

Figure 8 is a view in longitudinal section of a patch such as made by our improved apparatus;

Figure 9 is a plan view of the patch 21 made by our improved apparatus.

In carrying out our invention we preferably employ what is generally known in the trade as a belt-knife splitting machine which includes a frame 1 supporting a drive shaft 2 extending longitudinally of the frame and having a pulley 3 thereon to which motion is transmitted.

4, 4 represent pulleys located at the ends of the frame 1 and which support and drive an endless belt-knife 5. Motion is transmitted to one of the pulleys 4 through the medium of a pinion 6 on drive shaft 2 meshing with a gear 7 fixed to turn with the pulley.

The frame 1 also supports a vertically adjustable soft rubber pressure roll 8 with an adjusting roll 9 below the same to vary the pressure. As the particular means for varying the pressure constitutes no portion of our invention it is needless to describe the same in detail.

Above the pressure roll 8 a gage roll 10 is located, and above the gage roll 10 our improved pattern roll 11 is mounted in the frame 1. The upper run of the belt-knife 5 cuts at a point between the gage roll 10 and the pattern roll 11, and, to be more specific, cuts directly against the face of the pattern roll 11.

The gage roll 10 is made up of sections so that it is more or less flexible to force the material passing between the rolls into the recesses or pockets 12 formed in the pattern roll 11, and we preferably employ a type of gage roll made up of individual, separated rings 13, movable transversely of a shaft 14 and limited in their longitudinal movement by collars 15 secured on the shaft.

16 represents a guide table for guiding the tire 17 or other strip between the rolls 10 and 11, and 18 indicates a guide or guiding means for the upper run of the belt-knife to hold the same to its work. This guide means 18 constitutes a well known type of construction forming a part of a machine in general use and we therefore do not wish to be limited to any particular means for this purpose but it is desirable and probably necessary to have some means at this point to hold the upper run of the blade to its work.

19 represents a scraper or blade which engages the surface of the pattern roll 11 so as to free the pattern roll from any patch 21 which might tend to remain in a recess of the pattern roll.

In the drawings we have illustrated gear trains and other standard mechanism for transmitting motion to the several parts which are standard equipment and form no part of our invention except of course that it is necessary to transmit rotary motion to the pressure roll 8 and pattern roll 11.

We also employ a blade or scraper 20 adjacent the gage roll 10 to prevent any possibility of the tire or other strip 17 fed to the apparatus from following the contour of the gage roll 10.

We would call particular attention to the shape of the recesses 12 in the pattern roll 11, these recesses being deepest at the center of each recess and then tapering toward all edges of the recesses both longitudinally and circumferentially of the pattern roll. This construction of recess enables us to make square patches 21 which are thickest at the center and tapered to all edges so that, when said patches are made from a tire, the thicker intermediate or central portion of the patch may constitute any number of plies of material, gradually decreasing the number of plies as the patch grows thinner toward its edges.

Our improved apparatus is especially adapted for use in making patches 21 from old tires, and in utilizing these tires the beads of the tire are removed after the endless tire is cut transversely and one end of the tire is fed over the table or platform 16 between the pattern roll 11 and the gage roll 10, as clearly indicated in Figure 7 of the drawings. As the tire passes between these rolls the upward pressure imparted to the gage roll 10 by the soft rubber roll 8 forces the material of the tire 17 into the recesses 12 of pattern roll 11, and as the upper run of the cutter 5 cuts against the edge or periphery of the pattern roll 11 it will remove from the tire a patch 21 of the shape of the recess in the pattern roll, so that the making of patches is a continuous one, the pattern roll having in its periphery any desired number of these recesses.

In the particular illustration we have shown the pattern roll as having two of these recesses at one cross section of the roll, but it is perfectly obvious that a roll of any length may have any desired number of these recesses longitudinally and any desired number of tires or other analogous material may be fed simultaneously through the apparatus.

With an apparatus such as above described we are enabled to quickly and accurately cut patches 21 of the desired shape ready for use, and we can therefore furnish the market with patches which are perfectly made at a lower cost than is possible under heretofore known methods.

While we have illustrated and described a preferred embodiment of our invention, it is obvious various changes and alterations might be made in the general form of the parts described without departing from the invention and hence we do not limit ourselves to the precise details set forth but consider ourselves at liberty to make such changes and alterations as fairly fall within the spirit and scope of the appended claim.

We claim:

A tire patch cutting apparatus, including a pattern roll having recesses therein of the shape of patches to be made, an endless belt-knife cutting against the face of the pattern roll, a gage roll below the pattern roll having flexibility, a pressure roll engaging the gage roll whereby when a tire is fed between the pattern roll and the gage roll portions of the tire are forced into the recesses of the pattern roll and cut from the tire by the action of the knife, a scraper for freeing patches from the recesses of the pattern roll, and a scraper for preventing the tire from following around the gage roll.

ADOLPH R. HENDRY.
CHARLES HENDRY.